(12) United States Patent
Balasaygun et al.

(10) Patent No.: US 10,917,611 B2
(45) Date of Patent: Feb. 9, 2021

(54) VIDEO ADAPTATION IN CONFERENCING USING POWER OR VIEW INDICATIONS

(71) Applicant: Avaya Inc., Santa Clara, CA (US)

(72) Inventors: Mehmet Balasaygun, Freehold, NJ (US); John Buford, Princeton, NJ (US)

(73) Assignee: Avaya Inc., Santa Clara, CA (US)

( * ) Notice: Subject to any disclaimer, the term of this patent is extended or adjusted under 35 U.S.C. 154(b) by 501 days.

(21) Appl. No.: 14/734,085

(22) Filed: Jun. 9, 2015

(65) Prior Publication Data
US 2016/0366369 A1 Dec. 15, 2016

(51) Int. Cl.
*H04N 7/14* (2006.01)
(52) U.S. Cl.
CPC ....... *H04N 7/147* (2013.01); *H04N 2007/145* (2013.01)
(58) Field of Classification Search
USPC .......................................... 348/14.01–14.12
See application file for complete search history.

(56) References Cited

U.S. PATENT DOCUMENTS

| | | | |
|---|---|---|---|
| 5,659,692 A | 8/1997 | Poggio et al. | |
| 5,809,455 A | 9/1998 | Nishiguchi et al. | |
| 5,826,230 A | 10/1998 | Reaves | |
| 5,867,574 A | 2/1999 | Eryilmaz | |
| 6,314,395 B1 | 11/2001 | Chen | |
| 6,374,211 B2 | 4/2002 | Stegmann et al. | |
| 6,453,041 B1 | 9/2002 | Eryilmaz | |
| 6,469,733 B2 | 10/2002 | Chong et al. | |
| 6,611,503 B1 | 8/2003 | Fitzgerald et al. | |
| 7,184,602 B2 | 2/2007 | Cohen et al. | |
| 7,512,698 B1 | 3/2009 | Pawson | |
| 7,539,504 B2 * | 5/2009 | Ruef | H04M 1/05 345/8 |
| 7,769,585 B2 | 8/2010 | Wahab | |
| 8,249,237 B2 | 8/2012 | Jeong et al. | |
| 8,259,624 B2 | 9/2012 | Schirdewahn | |
| 8,301,697 B2 * | 10/2012 | Sethi | G06Q 10/10 709/204 |
| 8,310,520 B2 | 11/2012 | Gopal et al. | |
| 8,416,279 B2 | 4/2013 | Pepperell | |
| 8,482,593 B2 | 7/2013 | Periyannan et al. | |
| 8,760,490 B2 | 6/2014 | Wu et al. | |
| 8,861,701 B2 | 10/2014 | Abuan et al. | |
| 2002/0093531 A1 * | 7/2002 | Barile | H04N 7/148 715/753 |

(Continued)

*Primary Examiner* — Maria El-Zoobi
(74) *Attorney, Agent, or Firm* — Sheridan Ross P.C.

(57) ABSTRACT

Conferencing applications run a variety of devices, including portable devices, such as smart phones, laptop computers, and tablet computers. A source device may be taking a high-resolution video to provide the video as a conference portion of a conference being viewed by a number of devices. The number of devices displaying the conference may only be displaying the conference portion as a thumbnail image, or other low-data image, or not be currently displaying the conference portion at all. The number of devices viewing the conference may then signal back to the source device to downgrade/terminate the capturing and/or transmission of the video. The source device then provides the video or other conference portion in a data-thrifty format more closely matching the conference portion as it is being displayed on the number of devices.

19 Claims, 7 Drawing Sheets

(56) References Cited

U.S. PATENT DOCUMENTS

| | | | |
|---|---|---|---|
| 2008/0136895 A1* | 6/2008 | Mareachen | H04N 7/147 348/14.03 |
| 2008/0144949 A1* | 6/2008 | Inoue | H04N 19/117 382/233 |
| 2011/0039605 A1* | 2/2011 | Choi | H02J 7/0047 455/573 |
| 2011/0279640 A1* | 11/2011 | Choi | H04N 21/4788 348/14.12 |
| 2011/0292165 A1* | 12/2011 | Berger | H04L 65/403 348/14.12 |
| 2012/0050455 A1* | 3/2012 | Santamaria | H04L 61/256 348/14.11 |
| 2012/0250762 A1* | 10/2012 | Kaye | H04W 28/08 375/240.07 |
| 2012/0268553 A1* | 10/2012 | Talukder | H04L 12/1818 348/14.08 |
| 2013/0135427 A1* | 5/2013 | Wu | H04N 21/23655 348/14.09 |
| 2013/0215213 A1* | 8/2013 | Power | H04L 65/4076 348/14.02 |
| 2013/0322516 A1* | 12/2013 | Zhang | H04N 19/30 375/240.02 |
| 2014/0098182 A1* | 4/2014 | Kramarenko | H04N 7/141 348/14.12 |
| 2015/0009282 A1* | 1/2015 | Mai | H04N 7/147 348/14.12 |
| 2015/0023169 A1* | 1/2015 | Wu | H04L 47/6215 370/235 |
| 2016/0065894 A1* | 3/2016 | Lin | H04N 7/152 348/14.07 |
| 2016/0065984 A1* | 3/2016 | Nejat | G06F 16/78 348/231.3 |

* cited by examiner

VIDEO ADAPTATION IN CONFERENCING USING POWER OR VIEW INDICATIONS

FIELD OF THE DISCLOSURE

The present disclosure is generally directed toward data conservation in electronic conferencing.

BACKGROUND

Bandwidth usage during a video conference impacts the user experience and overall energy consumption. Mobile devices are particularly sensitive to bandwidth use. Packet level may be increased or decreased in response to available bandwidth in the network. In multi-party conference systems, video from each endpoint may be combined in a composite and delivered to each participant. Due to screen real-estate versus the number of participants, not all participants may be displayed at all endpoints. Additionally, endpoints running solely on batteries may experience low battery conditions.

SUMMARY

It is with respect to the above issues and other problems that the embodiments presented herein were contemplated.

Current systems do not detect whether a video stream is actually being viewed by a human and use that to information determine whether bandwidth can be saved by not transmitting the content to the user's endpoint.

In one embodiment, upstream bandwidth consumption is reduced in response to an aspect of the current video being viewed by another device. As a benefit, compositing overhead is reduced. Mobile device power usage is reduced due to 1) eliminating video encoding at the source endpoint and 2) fewer packets being sent over a wireless interface.

A source device provides the origination of a video stream. The video stream may be a live capture from the source device's video camera, a playback of video content, or a combination thereof. In one embodiment, real-time feedback is provided to a source device to reduce video transmission based upon the determination of whether any viewing endpoints in the conference are displaying the video from the source device. In another embodiment, power management of the viewing devices may be enforced by the video content provided by the source device.

In one embodiment, a communication device is disclosed, comprising: a network interface; a video sensor configured to capture a video image; and a video controller configured to receive a throttling signal via the network interface and in response thereto, adjust an attribute of the video image, the attribute effecting the bandwidth utilized to upload the video image to a network via the network interface.

In another embodiment, a method is disclosed, comprising: receiving a conference content from a first conference device; broadcasting, via a network connection, a conference comprising the conference content to a second conference device; receiving a conference mode indicia from the second conference device; and signaling the first conference device to alter the conference content in accord with the conference mode indicia.

In another embodiment a server is disclosed, comprising: a network interface configured to receive a conference portion comprising a video from a first device and transmit a conference comprising the conference portion to a second device; a processor, configured to receive via the network interface, a first indicia of a presentation mode of the conference portion by the second device and, in response to the first indicia, transmit to the first device, via the network interface, a throttling signal.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The embodiments described in systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
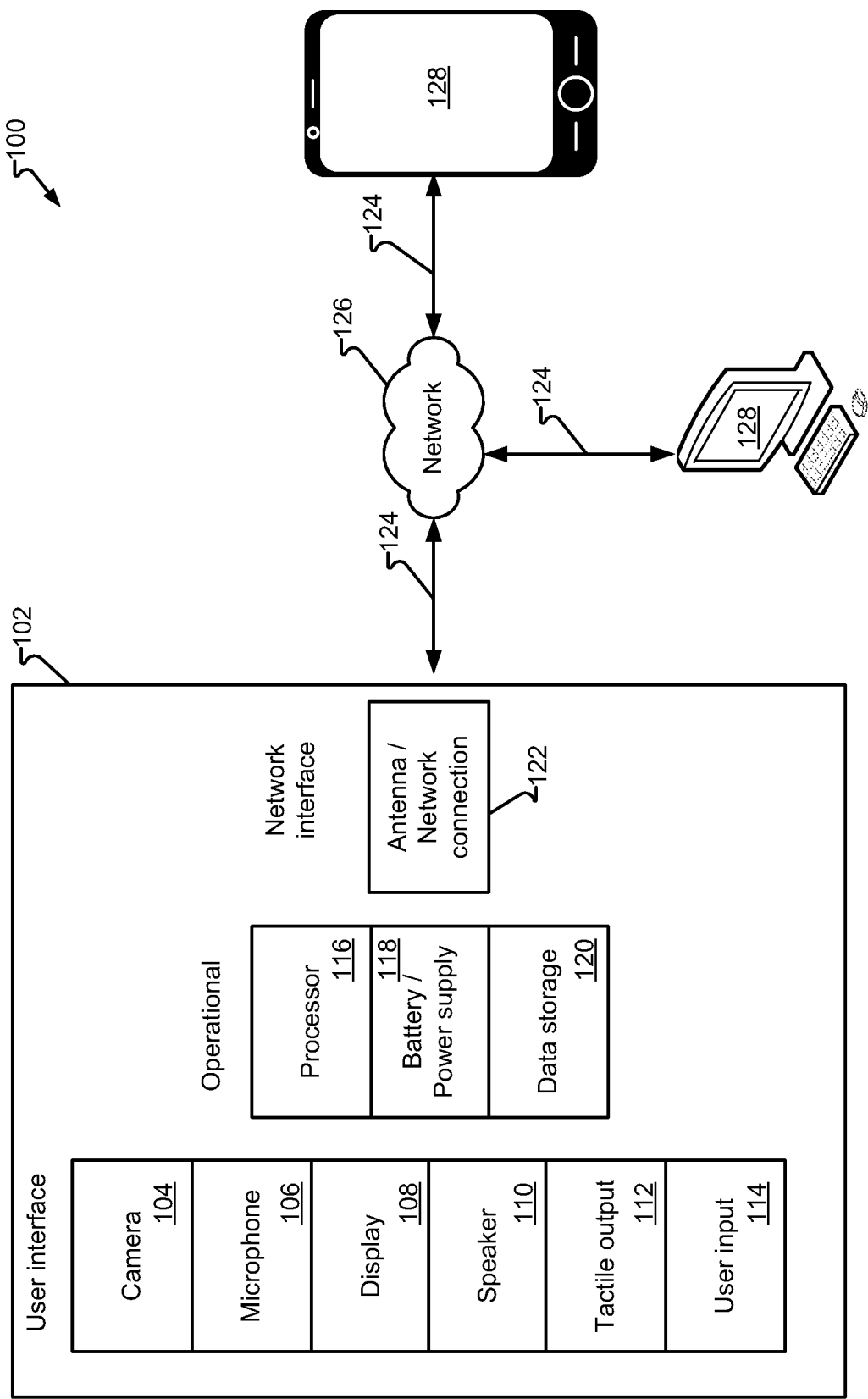
FIG. 1 depicts a first system in accordance with embodiments of the present disclosure.

FIG. 1 depicts system 100 in accordance with embodiments of the present disclosure. In one embodiment, system 100 comprises first endpoint 102 connected to network 126 via at least one link 124 of a number of links 124 connecting network 126 to a number of other devices. One or more secondary endpoints 128 are attached to network 126 via their respective network link 124. Endpoint 102 may provide a conference portion, such as live video, audio, or other real-time content, which may be presented by secondary endpoint 128 for viewing by a user associated therewith. Additionally, one secondary endpoint 128 may provide conference content for conference on endpoint 102 and/or another secondary endpoint 128. In one embodiment, the conference portion of a conference provided by endpoint 102 is live video, such as of a user associated with endpoint 102. In another embodiment, the conference portion comprises live audio, such as of the user associated with endpoint 102 speaking A combination of live audio, video, and optionally other content (e.g., previously stored video, still images, audio, files, documents, links, etc.) may also be provided by endpoint 102 as part of the conference portion of a conference.

In one embodiment, a conference comprises a number of connections to conference portions (e.g., audio, video, files, links, etc.) for aggregation and compilation/mixing by a conferencing application. The conference, as presented by a conference application running on endpoint 102 and/or one of secondary endpoints 128, may also have additional content provided (e.g., list of participants, agenda, access to stored materials, etc.) As a benefit, a viewer of a conference can see and/or hear a conference comprising one or more conference portions on a single application. The conference may be presented by a host server, which is discussed in more detail with respect to host 224 (See, FIG. 2).

Network 126 connects endpoint 102 and one or more of secondary endpoints 128. Network 126 may comprise one or more public and private networks, including but not limited to, the Internet, cellular network, LANs, and WANs. Network link 124 may be one or more wired connection (e.g., Ethernet), wireless connection (e.g., Wi-Fi, cellular telephone, Bluetooth, near field communications, infrared), or combination thereof (e.g., wireless to a router or switch and wired thereafter).

Endpoint 102 comprises various components generally arranged as user interface components, operational components, and network interface components. Other endpoints, such as secondary endpoint 128, may comprise similar components as those illustrated with respect to endpoint 102 and/or additional, different, or fewer components. Endpoint 102 comprises user interface components including one or more of camera 104, microphone 106, display 108, speaker 110, tactile output 112, and user input 114. Operational components may include processor 116, which may in itself comprise a plurality of processors, battery and/or power supply 118, and data storage 120. Network interface may comprise one or more components, such as a radio-frequency antenna, optical, and/or wired network connection 122. Components within endpoint 102 may be variously connected to interact with each other and, utilizing antenna/network connection 122, communicate with components attached to network 126.

Endpoint 102 may implement one or more applications, such as a conferencing application to receive and display conferences and/or to contribute a conference portion, such as a video portion captured by camera 104. Endpoint 102 may execute an operating system, such as to provide command signals and data flow between components of endpoint 102. Endpoint 102 may implement one or more drivers to integrate components (e.g., antenna/network connection 122, display 108, speaker 110, etc.) to send and receive data and/or command signals to and from processor 116. In one embodiment, antenna/network connection 122 receives a signal which, via a network driver is provided to processor 116 for execution by an application, which may further comprise an operating system. The signal is interpreted as a presentation mode of video content being captured by camera 104. A video driver or other application then causes the video mode to be modified, such as to switch to a lower data/bandwidth video format or discontinue capturing and/or transmitting video altogether.

To receive a conference, a signal received by antenna/network connection 122 is processed by processor 116 and displayed on display 108 and/or speaker 110. As can be appreciated, data storage 120 provides one or more repositories for user data, applications, configurations, and other accessible data. Additionally, it should also be appreciated that battery/power supply 118 provides electrical power to components of endpoint 102. A user operating endpoint 102 may additionally provide content, a conference portion, to a conference being viewed by other users, such as users of endpoint 128. In one embodiment, endpoint 102 receives an image from camera 104 which is processed by processor 116, such as to apply compression to the captured video image and otherwise enable it for streaming and/or uploading the antenna/network connection 122. Additionally, microphone 106 and/or user input 114 may similarly provide content for the conference portion.

Figure 2:
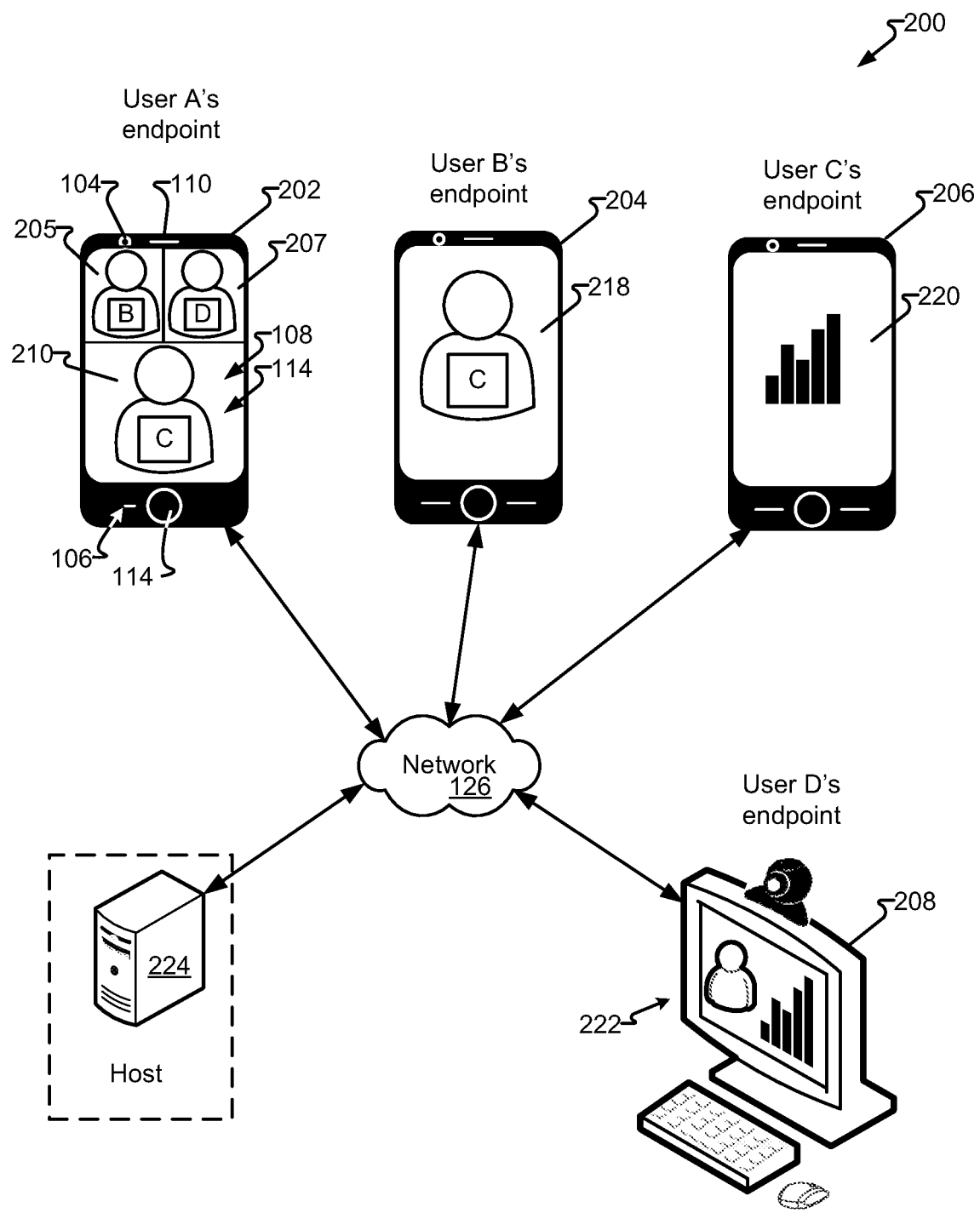
FIG. 2 depicts a second system in accordance with embodiments of the present disclosure.

FIG. 2 depicts system 200 in accordance with embodiments of the present disclosure. In embodiments wherein only two devices, such as endpoint 204 and endpoint 206 are engaged in a conference and communicating via network 126. Endpoint 204 and endpoint 206 may exchange voice, still images, video images, stored files, or other conference content. In another embodiment, endpoint 202, endpoint 204, and additional devices, such as endpoint 206 and endpoint 208, are engaged in a conference. As a further option, host 224 may manage the conference, such as by aggregating video and other visual inputs, floor control for a current speaker or presenter, participant management, stored document access, etc. However, the hosting functionality may be provided by one of endpoints 202, 204, 206, 208, which may provide functionality with respect to endpoint 102.

Endpoints 202, 204, 206 are embodied as portable devices, such as a smart phone. Portable devices may also include laptop computers, tablet computers, or any device configured to be portable for the display and optional contribution to the conference content. The type of endpoint may determine, in whole or in part, a particular video format requested from a video source based upon the endpoint's known or suspected bandwidth, processing power, and/or screen availability. For example a cellular telephone may be known to have a smaller screen and utilize wireless networks, which may then be used to determined video format from a source endpoint. Endpoint 208 is embodied as a desktop computer, which may be receiving power from a wall outlet and/or communicating via network 126 via wired connection. Endpoint 208 may signal or otherwise be known as capable of displaying more video information and having a higher bandwidth, therefore conference presentation 222 may indicate a need for more data-intensive video. Mobile devices, such as endpoints 202, 204, 206 may be known or signal a more limited availability of screen "real estate" in order to display a video, as well as, limitations on bandwidth when utilizing wireless networks (e.g., WiFi, cellular, etc.). As can be appreciated by those of ordinary skill in the art, other device types and combinations thereof are contemplated without departing from the scope of the embodiments provided herein.

Endpoint 202 comprises microphone 106, camera 104, speaker 110, display 108, and one or more user inputs 114, such as a screen and/or one or more button inputs. Endpoint 202 may comprise additional or few components (See FIG. 1). Endpoints 204, 206, and 208 may similarly comprise components illustrated with respect to FIG. 1 as embodied and/or configured for use with the respective devices, which are not shown or identified to avoid unnecessarily complicating the figure by including known hardware components.

In one embodiment, endpoints 202, 204, 206, 208 are engaged in a conference. Endpoint 202, associated with user A, is presently displaying conference portions 205, 207, 210. Conference portion 205 comprising a video image provided by user B by a camera associated with user endpoint 204. Conference portion 207 comprising a video portion of user D by a camera associated with user endpoint 208. Endpoint 206, associated with user C, is presently displaying conference portion 220, which is not a live feed from any video camera associated with any of endpoints 202, 204, 208. Endpoint 208, associated with user D, is presently displaying conference portion 220 comprising a video feed from user C's endpoint 206, as well as a non-live video image.

In one embodiment, user endpoints 202, 204, 206, 208 are executing a conferencing application whereby content received from network 126 is presented for display. Although not illustrated, endpoints 202, 204, 206, 208 may also be receiving and presenting audio signals, such as spoken words received by a microphone, such as microphone 106. Endpoints 202, 204, 206, 208 may comprise an audio control that follows the current speaker or may be user selectable. Optionally, host 224 provides conference and conferencing management, such as the aggregation of images, video feeds, audio feeds, static images, and/or other conference content. Additionally, endpoints 202, 204, 206, 208 may receive a user's input to determine video content and/or other content being displayed or otherwise presented (e.g. audio).

In the embodiment illustrated by system 200, endpoint 202 is currently displaying conference portions 205, 207, 210, each comprising a live video feed received from endpoint 204, 208, 206 respectively. Additionally, no device is presently displaying video content from endpoint 202. Endpoint 202 may be capturing a video image of user A with an associated camera 104, as well as transmitting the video feed, which may be compressed or otherwise processed by a processor 116 associated with endpoint 202. The processed video is then uploaded to network 126 or otherwise made available to endpoints 204, 206, 208 for the display, even if a user has not selected the video captured and uploaded by endpoint 202 for display. As a further embodiment, conference hosting software, which may be executed on host 224 or one of endpoints 202, 204, 206, 208, may automatically detect a current speaker and display a video feed associated with the device of the current speaker. As a further option, one of endpoints 202, 204, 206, 208 may be providing hosting duties and provide a signal to display the video feed of the device of the current speaker to cause the other devices to then present the speaker's video feed.

In another embodiment, one or more of endpoints 204, 206, 208 indicate that they are not displaying video content from endpoint 202. Endpoint 202 may then receive the signal or signals and respond by termination of the capture and or uploading of the video signal received from camera 104. Optionally, a conference host, such as host 224, may aggregate signals so that only if the number of endpoints displaying a particular video feed goes to zero, the video will terminate, or once zero, goes to non-zero, the video will resume. As a benefit, endpoint 202 conserves battery, processing power, and communication bandwidth, which then may be made available for other purposes. In another embodiment, only endpoint 202 is presently displaying the video feed from endpoint 204. Conference portion 205 is a reduced size image of the video captured by user endpoint 204. Accordingly endpoint 202 may signal user endpoint 204 of the reduced size and in response, endpoint 204 may capture and/or upload a smaller image and thereby reduce processing and bandwidth demands that would otherwise be wasted for the display of conference portion 205. Similarly, conference portion 207 may notify user endpoint 208 to similarly reduce the video size captured and/or uploaded to network 126.

In one embodiment, an endpoint reduces its video data, comprising the amount of data utilized in a given period of time to provide a video stream, down to the highest common denominator. For example, endpoints 202 are displaying a lower-resolution video of the video content provided by endpoint 206, however, endpoint 208 is displaying a high-resolution image. Endpoint 206 may then provide video content in a high-resolution format. In another embodiment, a majority view is provided such that the resolution desired by most of the endpoints 202, 204, 208 is provided by endpoint 206 and a higher or lower resolution requested by a minority of endpoints 202, 204, 208 is ignored by endpoint 206 or the request is not provided to endpoint 206. As can be appreciated, additional rules may be provided for dissimilar group requests. When no endpoint is viewing a particular content, such as no endpoint 204, 206, 208 is displaying the video content from device 202, the video supplied by device 202 may be terminated. If one endpoint 204, 206, 208 requests the video from endpoint 202, then endpoint 202 may, in one embodiment, provide video in a format according to the displaying device and not based upon the majority of endpoints, as the majority would be no-video. As a further alternative, an endpoint not displaying or not displaying video with enough resolution may cause a proxy image to be provided. For example, a video feed being aggregated with many other images or otherwise displayed as a small image may be difficult to appreciate as a video. As a result, a still image may be captured from the video and used as the video image.

In another embodiment, other forms of content may be provided in place of video without departing from the embodiments described herein. For example, audio, still images, and/or other data may be provided in at least two formats, the format provided being determined by the presented format of the data.

Figure 3A:
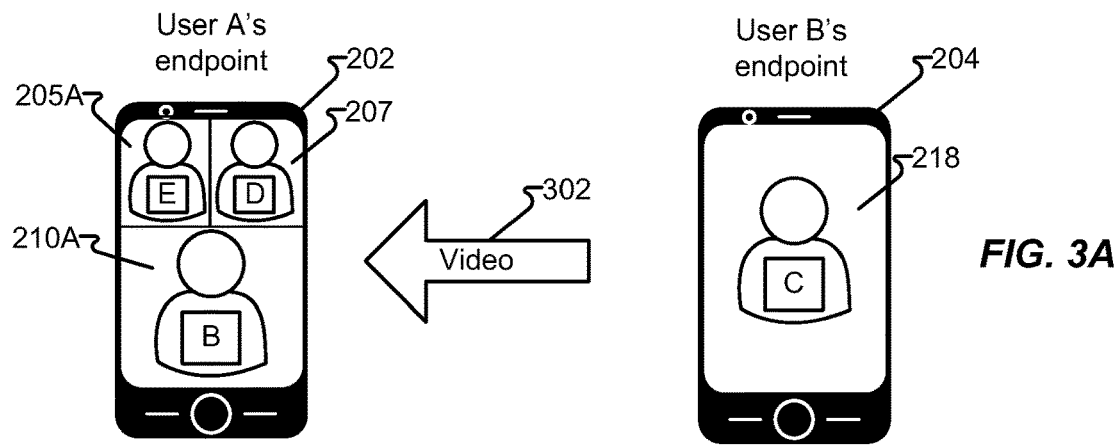
FIG. 3A depicts a first portion of a first conference in accordance with embodiments of the present disclosure.
Figure 3B:
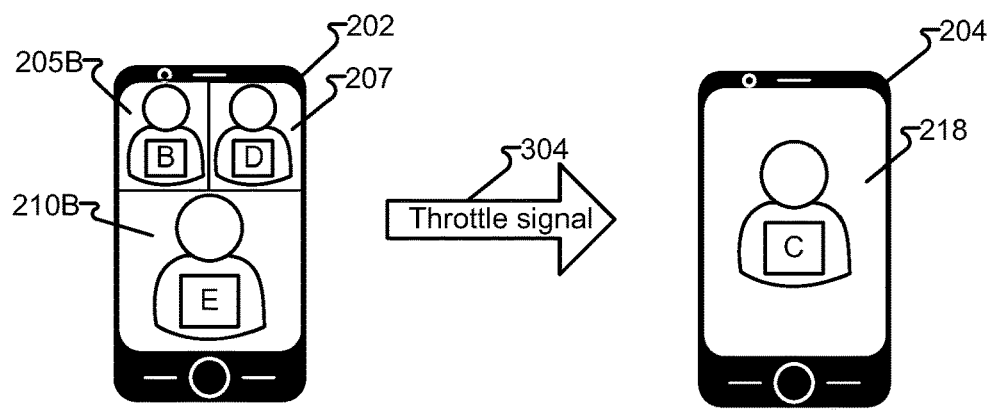
FIG. 3B depicts a second portion of a first conference in accordance with embodiments of the present disclosure.
Figure 3C:
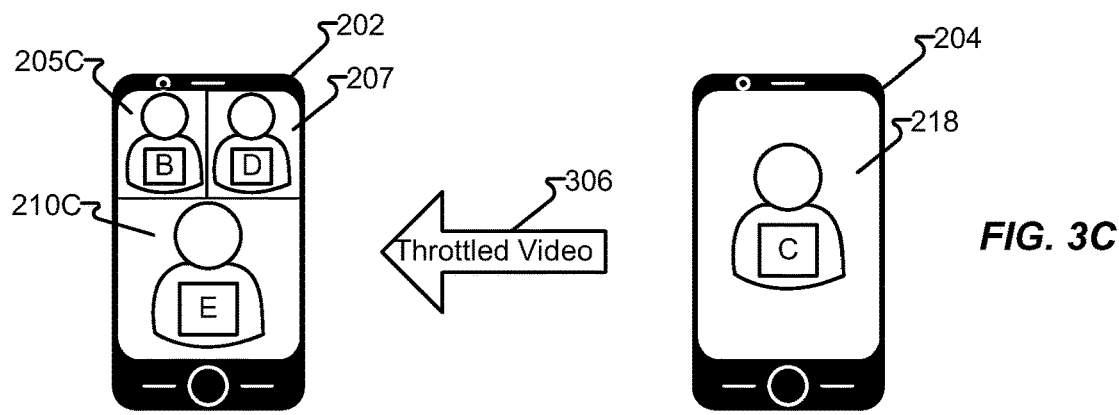
FIG. 3C depicts a third portion of a first conference in accordance with embodiments of the present disclosure.

FIGS. 3A-3C depict a first conference in accordance with embodiments of the present disclosure. FIG. 3A depicts a first portion of the first conference. Endpoint 204, associated with "User B," is displaying conference portion 218 and providing live video stream 302. Endpoint 202, associated with "User A," may receive video 302 either directly (e.g., point-to-point conferencing) or via network 126 and optionally via or utilizing host 224. Endpoint 202 is presently displaying conference portions 205A, 207, and 210A. Conference portions may be machine determined (e.g., the detected speaker, all parties when the number of participants is below a threshold number, the most recent speakers, etc.) and/or human determined. FIG. 3B depicts a change in what is being displayed on endpoint 202. Now endpoint 202 is displaying conference portion 205B, 207, and 210B. The video stream from "User B" has transitioned from the larger format of conference portion 210A to a smaller format in conference portion 205B. The video stream from "User E" has transitioned from the smaller format of conference portion 205A to the larger format of conference portion 210B.

Endpoint 202 may be in a less than ideal state, so the data received to display conference portion 210A now only needs to be large enough to display the content as conference portion 205B. In contrast, the content needed to display conference portion 205A now needs to be expanded, possibly with a loss in resolution, to display as conference portion 210B. However, endpoint 202 sends throttle signal 304 to endpoint 204. As endpoint 202 is presently the only endpoint displaying the video content 302, endpoint 204 then captures and/or transmits a smaller video image. FIG. 3C depicts device 204 transmitting throttled video 306 to device 202 to provide a more economical video stream as compared to maintaining the same quality of image but in a larger format, such as when displayed as conference portion 210A.

Figure 4:
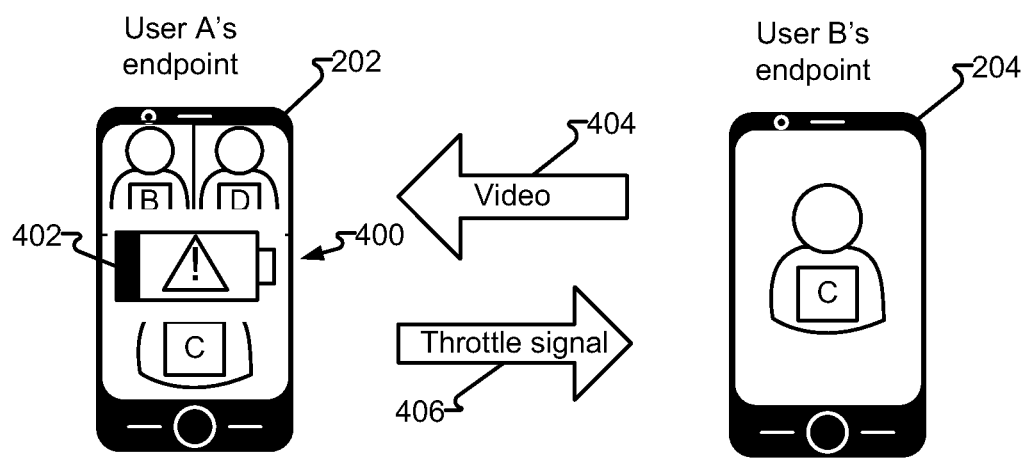
FIG. 4 depicts a second conference in accordance with embodiments of the present disclosure.

FIG. 4 depicts a second conference in accordance with embodiments of the present disclosure. In one embodiment, endpoint 204 is providing video content 404 to endpoint 202. The format of video content 404 initially being in a first format. Endpoint 202 comprises battery/power supply 400, which may be one of battery/power supply 113. Battery/power supply may be a storage battery or other form of inconsistent power (e.g., solar panel, human power, wind, etc.). In another embodiment, battery/power supply 400 is in a reduced state, such as a drained battery or less than optimal supply of electrical power. Endpoint 202 may display low-battery icon 402 to present user A with a visual indication of the current state of battery/power supply 400. In response to the current state of battery/power supply 400, end point 202 then sends throttling signal 406 to endpoint 204.

In another embodiment, the state of battery/power supply 400 may be in an impaired state due to another demand placed thereon. For example, user A may be charging another device with endpoint 202, performing a processor-demanding operation, streaming additional data sources or otherwise causing endpoint 202 to require video content 404 to be presented in a format more suitable to the second format. In one embodiment, endpoint 202 is receiving video content 404 in a first format but displaying the video in a second format, such as in response to the present state of battery/power supply 400. In another embodiment, endpoint 202 is presenting the video received in video content 404 but issues a request as throttling signal 406 to then display the video in the second format.

In another embodiment, endpoint 204, in response to receiving throttling signal 406, indicating the low-battery or other impaired state of battery/power supply 202, which is or may be affecting the ability of endpoint 202 to receive and/or display video 404 received in the first format, initiates video content 404 in a second format requiring less data per unit of time.

In one embodiment, the second format, as compared to the first format, has one or more of a reduced size, frame rate, resolution, compression type (e.g., "lossy" versus loss-less), or other aspect of a video that may be deployed to present a video for display utilizing less data to relieve the bandwidth, power consumption and/or processor demands.

Figure 5:
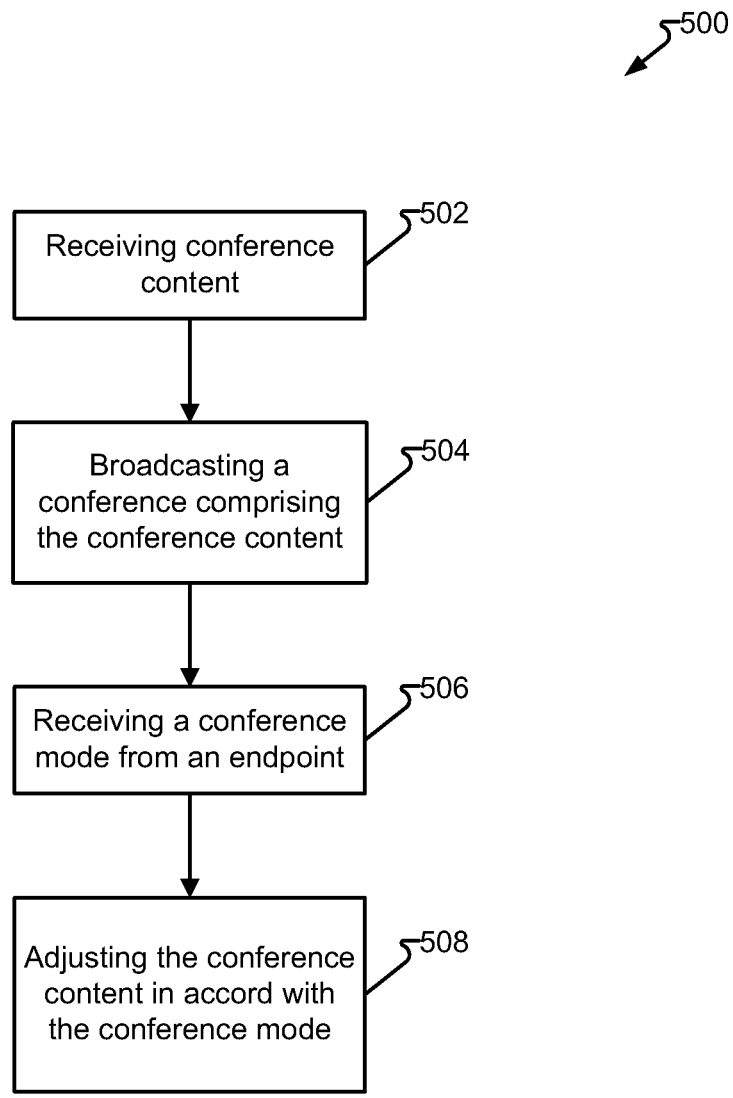
FIG. 5 depicts a first process in accordance with embodiments of the present disclosure.

FIG. 5 depicts process 500 in accordance with embodiments of the present disclosure. In one embodiment, process 500 performs step 502 to receive conference content, such as by one of endpoints 102, 128, 202, 204, 206, 208, providing a data stream or content of a data stream for a conference. Next, step 504 broadcasts a conference, comprising the conference content, to a number of endpoints, such as by one of endpoints 102, 128, 202, 204, 206, 208. The broadcasting may be performed by one of endpoints 102, 128, 202, 204, 206, 208 acting as a host or a dedicated host, such as host 224.

Next, step 506 receives a conference mode from an endpoint, such as by one of endpoints 102, 128, 202, 204, 206, 208. In one embodiment, the mode indicates the type of device receiving the content (e.g., wired, wireless, small-screen device, large screen device, etc.). The type of device may then be determined to be associated with a particular capacity for data and further associated with a video format. As a benefit, a determination may be made as to whether a device is capable to display a higher data video or if the device is limited to lower data video.

In addition to what a device is capable of receiving and/or displaying, a particular configuration may determine how a video is presently being displayed. In another embodiment, step 506 determines if a mode of an endpoint is presenting the conference content in a higher data format, a lower data format, or not at all.

Next, step 508 adjusts the conference content in accord with the conference mode. Therefore, a device that has the capability or is presently configured to display a lower-data video may then cause the source of the video to provide video that is in the lower-data format. As a further option, a device that is limited or presently configured to display a video below a certain size may be presented with a single still image that remains until either the size of the displayed video is increased, and the still image is replaced with a video, or until the conference has concluded and the conferencing application has terminated. As a further option, a still image may be periodically updated, such as every few minutes or upon the content of the video associated with the still image changing beyond a threshold amount from the still image.

Figure 6:
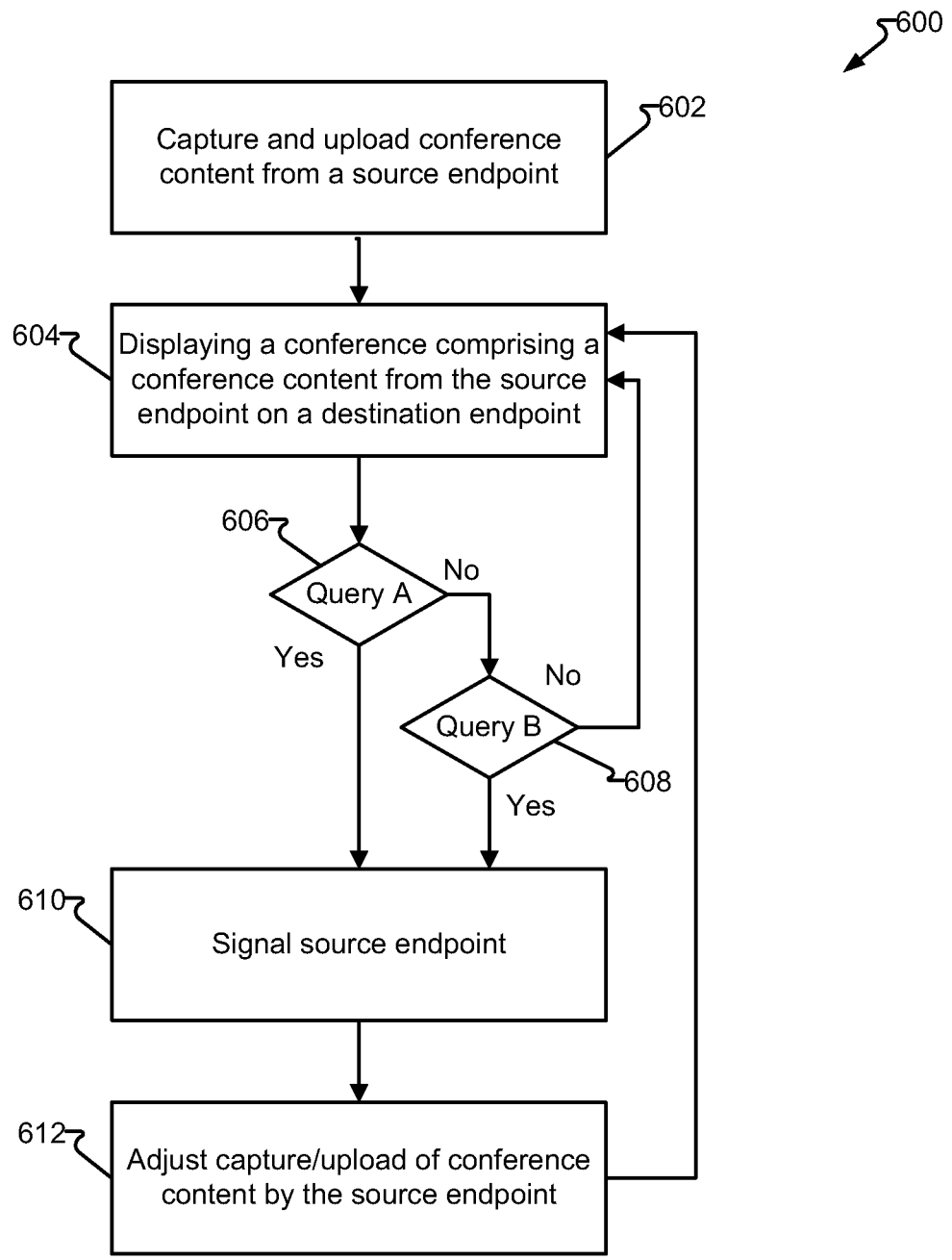
FIG. 6 depicts a second process in accordance with embodiments of the present disclosure.

FIG. 6 depicts process 600 in accordance with embodiments of the present disclosure. In one embodiment, step 602 captures and uploads conference content from a source endpoint, such as by one of endpoints 102, 128, 202, 204, 206, 208. The conference content being a data-variable content, such as video, audio, still images, etc. The conference content being displayable, visually and/or audibly, in at least two formats having different data demands.

Next, step 604 displays a conference comprising the conference content from the source endpoint. The conference is displayed on another endpoint. In another embodiment, the conference is displayed on the source endpoint.

Step 606 performs query A and determines if the conference content, which is being provided in a first format, is being displayed in a manner more closely associated with a second format. For example, if step 602 is providing the conference content in a high-data format but the conference content is being provided in a low-data format, or not being displayed at all, step 608 is determined in the affirmative. If step 606 is determined in the negative, process 600 may execute step 610 or optionally execute step 608.

Step 608 performs query B to determine whether the destination endpoint is presently in a power-limited state. If step 608 is determined in the affirmative, process 600 continues to step 610.

Step 610 signals the source endpoint, such as one of endpoints 102, 128, 202, 204, 206, 208 in accord with the determination from step 606 and/or 608. If the conference content provided in step 602 includes data that is unused, a more thrifty data format may be indicated. Similarly, if conference content provided in step 602 is being extrapolated to, for example, fill a larger display, then a higher data format may be indicated. Next, step 612 adjusts the capture and/or uploaded format of the conference content by the source endpoint.

For example, an audio signal from a microphone, such as microphone 106 may have a sampling rate modified to increase fidelity and the resulting data or decrease the fidelity and resulting data stream. Streaming video is the more data-intensive portion of an audio/video conference. Step 612 may increase or decrease, in accord the present limitation of the destination endpoint, the frame rate, size, resolution, compression type, or other aspect of a video being captured, such as by camera 104, processed, such as by processor 116, and/or uploaded, such as by antenna/network connection 122.

Figure 7:
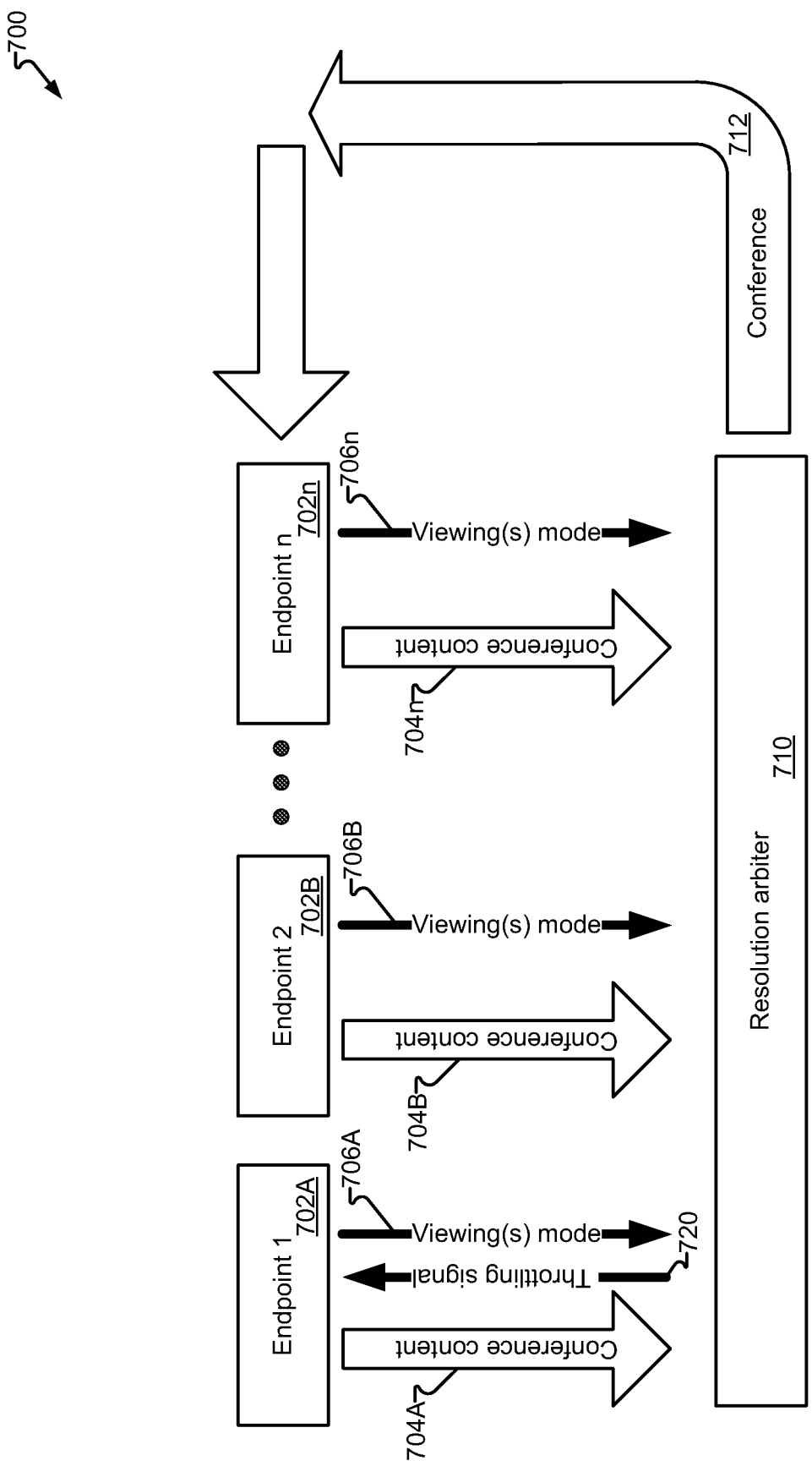
FIG. 7 depicts a conference in accordance with embodiments of the present disclosure.

FIG. 7 depicts conference 700 in accordance with embodiments of the present disclosure. In one embodiment, a number of endpoints 702 are participating in a conference. Each of endpoints 702 receives conference presentation 712. In one embodiment, not all endpoints 702 are presently displaying the same content at the same resolution. Endpoints 702 report viewing mode 706 to resolution arbiter 710.

Resolution arbiter 710 executes arbitration rules to determine whether conference content 704 from any of endpoints 702 should be throttled up or down. In one embodiment, resolution arbiter determines a highest capacity resolution for video and/or fidelity for audio. Accordingly, each conference content 704 is provided in a format for integration into conference 712 that is the maximum data for at least one of endpoints 702. In another embodiment, resolution arbiter 710 determines an average data format, whereby the median resolution capacity for all endpoints 702 then becomes the provided resolution via throttling signal 720. In another embodiment, resolution arbiter 710 may seek to minimize the data required from one or more conference contents 704. In such an embodiment, resolution arbiter 710 may provide throttling signal 720 indicating a minimum acceptable data format. For example, endpoint n 702*n* may be configured to accept high-definition video but accept a low-definition format. Resolution arbiter 710 may then determine throttling signal 720 in accord with what is minimally acceptable.

Throttling signal 720 is variously embodied and may be a unitary indicative signal, whereby the absence of throttling signal 720 indicates no change and the presence of throttling signal 720 indicates throttle down, or optionally, throttle up. In another embodiment, throttling signal 720 may comprise a parameter or other value indicator, such as a parameter to indicate that endpoint 702A, providing the conference content 704A, should throttle down to the third lower data format or throttle to a specific data format (e.g., 250×75 pixels at 5 frames per second). Resolution arbiter 710 may indicate a particular conference content 704 should be paused or substituted with a still image.

As can be appreciated by those of ordinary skill in the art, the specific algorithm executed by resolution arbiter 710 may be determined as a matter of design choice.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A communication device, comprising:
   a network interface;
   a video sensor that captures a video image;
   a video controller that receives a throttling signal, via the network interface, from an endpoint receiving the video image;
   wherein the throttling signal comprises a conference mode of a conference, the conference being provided by a host and the conference comprising the video image provided by the communication device and another conference portion provided by another device; and
   wherein, in response to the throttling signal, the video controller adjusts an attribute of the capturing of the video image by the video sensor, the attribute effecting an encoding of the video image uploaded to the host via the network interface for receipt, as a portion of the conference, by a number of devices associated with a number of conference participants, the conference comprising the video image as adjusted.

2. The communication device of claim 1, wherein the conference mode comprises indicia of an endpoint providing conference content.

3. The communication device of claim 1, wherein the throttling signal comprises indicia of battery charge for a battery powering the endpoint.

4. The communication device of claim 1, wherein:
   the throttling signal is generated by a conference application executing on the endpoint and presenting, on the endpoint, a conference content comprising the video image and a conference component.

5. The communication device of claim 4, wherein the conference mode comprises indicia of a communication type of the network interface being utilized by the endpoint receiving the conference content comprising the video image.

6. The communication device of claim 4, wherein the conference mode comprises indicia of a display mode of the conference component.

7. The communication device of claim 6, wherein the indicia of the display mode of the conference component, further comprises indicia of the conference component relative to the video image.

8. The communication device of claim 4, wherein:
   the communication device uploads, via the network interface, a conference comprising the conference content for display by the endpoint; and
   in response to receiving the conference mode, the conference content is modified in accordance with indicia of the conference mode.

9. The communication device of claim 1, wherein the attribute comprises at least one of frame rate, frame size, resolution, color, encoding method, and compression type.

10. A method, comprising:
    receiving a conference content comprising a video portion received from a first conference device and a conference component from a third conference device;
    broadcasting, via a network connection, a conference comprising the conference content to a second conference device;
    receiving a conference mode indicia from the second conference device, wherein the conference mode indicia is associated with the conference content as displayed on the second conference device; and
    signaling the first conference device to alter capturing of the video portion captured by a video sensor of the first conference device providing conference content in accordance with the conference mode indicia.

11. The method of claim 10, further comprising:
    determining that the conference mode indicia indicates the second conference device has been placed in a state, wherein the second conference device is displaying the conference content in a format requiring less bandwidth than a format of conference content received; and
    wherein the step of signaling the first conference device to alter the conference content in accord with the conference mode indicia, further comprises signaling the first conference device to throttle bandwidth of the conference content.

12. The method of claim 10, further comprising:
    determining that the conference mode indicia indicates the second conference device is not displaying the conference content; and
    wherein the step of broadcasting the conference further comprising, broadcasting the conference with a placeholder content in lieu of at least a portion of the conference content.

13. The method of claim 10, further comprising:
   determining that the conference mode indicia indicates the second conference device is not displaying the conference content; and
   wherein the step of signaling the first conference device to alter the conference content in accord with the conference mode indicia, further comprises signaling the first conference device to discontinue providing the conference content.

14. The method of claim 10, wherein the first conference device performs the step of broadcasting the conference.

15. A server, comprising:
   a network interface configured to receive a conference portion comprising a first video from a first device and a conference component from a third device and transmit a conference, comprising the conference portion, to a second device; and
   a processor, configured to receive by the second device and via the network interface, a first indicia of a presentation mode of the conference portion selected by a user of the second device, in response to the first indicia, transmit to the first device, via the network interface, a throttling signal to cause a video sensor of the first device to adjust capturing of an image captured thereby.

16. The server of claim 15, wherein the first indicia of the presentation mode indicates an absence of presentation of the conference portion by the second device and the throttling signal indicates termination of the conference portion.

17. The server of claim 15, wherein the first indicia of the presentation mode comprises a battery state indicia of the first device.

18. The method of claim 10, wherein the third conference device, providing the conference component, and the second conference device, receiving the conference, are the same conference device.

19. The server of claim 15 wherein the third device, providing the conference component, and the second device, receiving the conference, are the same device.

* * * * *